UNITED STATES PATENT OFFICE.

WALLACE S. CHASE, OF LAKEWOOD, OHIO, ASSIGNOR, BY MESNE ASSIGNMENTS, TO NATIONAL CARBON COMPANY, INC., A CORPORATION OF NEW YORK.

PROCESS OF OBTAINING CALCIUM-FLUORID PRECIPITATE.

1,329,072.  Specification of Letters Patent.  Patented Jan. 27, 1920.

No Drawing.  Application filed March 1, 1917. Serial No. 151,658.

*To all whom it may concern:*

Be it known that I, WALLACE S. CHASE, a subject of the King of Great Britain, residing at Lakewood, in the county of Cuyahoga and State of Ohio, have invented a certain new and useful Improvement in Processes of Obtaining Calcium-Fluorid Precipitate, of which the following is a full, clear, and exact description.

This invention relates to processes for producing calcium fluorid.

In prior processes of producing calcium fluorid great difficulty has been experienced in filtering and washing the precipitate on account of its slimy character. I have discovered a process for precipitating calcium fluorid of such character that it settles rapidly and is capable of being readily filtered and washed.

In the prior processes it has been the custom to employ dilute solutions to produce the precipitate, but I have found that if such solutions are concentrated the physical characteristics of the precipitate are altered to an extent which permits it to settle much more readily, and also to be filtered more easily, but not so satisfactorily as when heated, as hereinafter described. As a specific example of the process I will mention calcium fluorid. To produce this in accordance with my process I take a concentrated solution of calcium chlorid and bring it together with a concentrated solution of hydrofluoric acid. A precipitate is immediately formed in accordance with the following equation:—

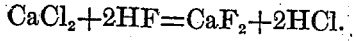

I believe this change in form of the precipitate is due mostly to the low concentration of the fluorid ion in the concentrated solution. Hydrogen fluorid is a gas having the formula $H_2F_2$ and when this is passed into water it dissolves and dissociates into the form HF in accordance with the following equation:—

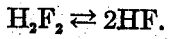

This dissociation proceeds until equilibrium is established and in concentrated solutions it will proceed to a less extent. The double molecules of hydrofluoric acid are not only slightly dissociated in concentrated solutions, into single molecules, but these single molecules are but slightly dissociated into hydrogen and fluorin ions even in dilute solutions.

Therefore, in concentrated solutions of this acid the low concentration of single molecules, HF, will result in a very low concentration of fluorin ions, so that the interaction between these and the calcium ions proceeds relatively slowly, thus causing a decided improvement in the physical characteristics of the precipitate.

After the precipitate is formed it is filtered and washed in well known ways and may be subjected to further processes, depending upon its intended use.

I have also found that this precipitate can be washed and filtered much better if it is dried out by heating at a temperature preferably between 100 and 150° C. The heating will be carried on until the mass is completely dried and then it is pulverized and washed in any way, such as by decantation with water to which a little hydrofluoric acid has been added to re-form calcium fluorid from any calcium chlorid that may have been produced during the heating operation.

I have mentioned above certain limits of temperature to be observed in heating the slimy calcium fluorid mass, but it will be understood that these need not be strictly adhered to in all cases. The object of the process is to heat the mass until it dries into a mass capable of being washed and filtered. Higher temperatures may be used, but detrimental reactions may result, such as the re-formation to a slight extent of calcium chlorid, if the temperature is elevated much above 150°.

The slimy precipitate of calcium fluorid, as well as fluorids of rare-earth metals, obtained by prior processes, can also be readily washed and filtered by drying in the way just described.

The drying process, however, is not to be limited to slimy precipitates of calcium and the rare-earth metals, as it can be used in connection with various other slimy precipitates.

Having described my invention, what I claim is:

1. The process of preparing insoluble fluorids of metals which consists in adding a concentrated solution of other compounds of said metals to a concentrated solution of hydrofluoric acid.

2. The process of preparing calcium fluorid which consists in adding a highly concentrated solution of a salt of calcium to a highly concentrated solution of hydrofluoric acid.

3. The process of preparing calcium fluorid which consists in adding a highly concentrated solution of calcium chlorid to a highly concentrated solution of hydrofluoric acid.

4. The process of preparing calcium fluorid, which consists in adding a concentrated solution of calcium chlorid to a highly concentrated solution of hydrofluoric acid, evaporating to dryness, pulverizing the dried mass, and then washing it free of soluble material.

5. The process of preparing calcium fluorid, which consists in adding a concentrated solution of calcium chlorid to a highly concentrated solution of hydrofluoric acid, evaporating to dryness, pulverizing the dried mass, and then washing it free of soluble material with water containing hydrofluoric acid.

In testimony whereof, I hereunto affix my signature.

WALLACE S. CHASE.